United States Patent
Stachura et al.

(10) Patent No.: US 6,671,722 B1
(45) Date of Patent: Dec. 30, 2003

(54) STACK-LESS, CPU-LESS CREATION OF VALID SNMP-TRAP PACKETS

(75) Inventors: Thomas L. Stachura, Portland, OR (US); Anil Vasudevan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/349,244

(22) Filed: Jul. 8, 1999

(51) Int. Cl.[7] ............................................. G06F 15/173
(52) U.S. Cl. ..................... 709/224; 709/203; 709/213; 709/214; 709/220; 709/223; 709/318; 341/65; 345/716
(58) Field of Search ............................. 709/318, 223, 709/224, 214, 220, 203, 208, 213, 230; 341/65; 345/716

(56) References Cited

U.S. PATENT DOCUMENTS

| | | | |
|---|---|---|---|
| 5,293,379 A | * | 3/1994 | Carr .............................. 341/65 |
| 5,710,908 A | * | 1/1998 | Man ............................. 709/230 |
| 5,909,549 A | * | 6/1999 | Compliment et al. ........ 709/223 |
| 5,915,094 A | * | 6/1999 | Kouloheris et al. .......... 345/716 |
| 6,009,431 A | * | 12/1999 | Anger et al. ................... 707/10 |
| 6,101,500 A | * | 8/2000 | Lau ............................. 707/103 |
| 6,182,157 B1 | * | 1/2001 | Schlener et al. ............. 709/318 |
| 6,219,705 B1 | * | 4/2001 | Steinberger et al. ......... 709/224 |
| 6,253,243 B1 | * | 6/2001 | Spencer ....................... 709/224 |
| 6,272,537 B1 | * | 8/2001 | Kekic et al. ................. 709/223 |
| 6,298,378 B1 | * | 10/2001 | Angal et al. ................. 709/223 |
| 6,330,600 B1 | * | 12/2001 | Matchefts et al. ........... 709/223 |

\* cited by examiner

Primary Examiner—Hosain Alam
Assistant Examiner—Thu Ha Nguyen
(74) Attorney, Agent, or Firm—Pillsbury Winthrop LLP

(57) ABSTRACT

A device, such as an Application Specific Integrated Circuit (ASIC) which has access to a memory, such as non-volatile RAM (NVRAM) or Electrically Erasable Programmable Read Only Memory (E²PROM). The device may reside in a PC or on a network interface card for providing an interface between the PC and a network, such as an Ethernet-based network. Software on the PC constructs a base packet or template for an SNMP trap PDU and stores the template into the NVRAM or E²PROM associated with the device. When the device determines the need to generate and send the SNMP trap PDU, the device can, without a CPU and without a full implementation of network layer software stacks, generate the SNMP trap PDU based on the base packet stored in the NVRAM. The device need only insert the non-static data into the packet built from the base packet before sending the packet to a communication controller, such as an Ethernet controller, which subsequently sends the packet over a network, such as the Ethernet-based network.

42 Claims, 11 Drawing Sheets

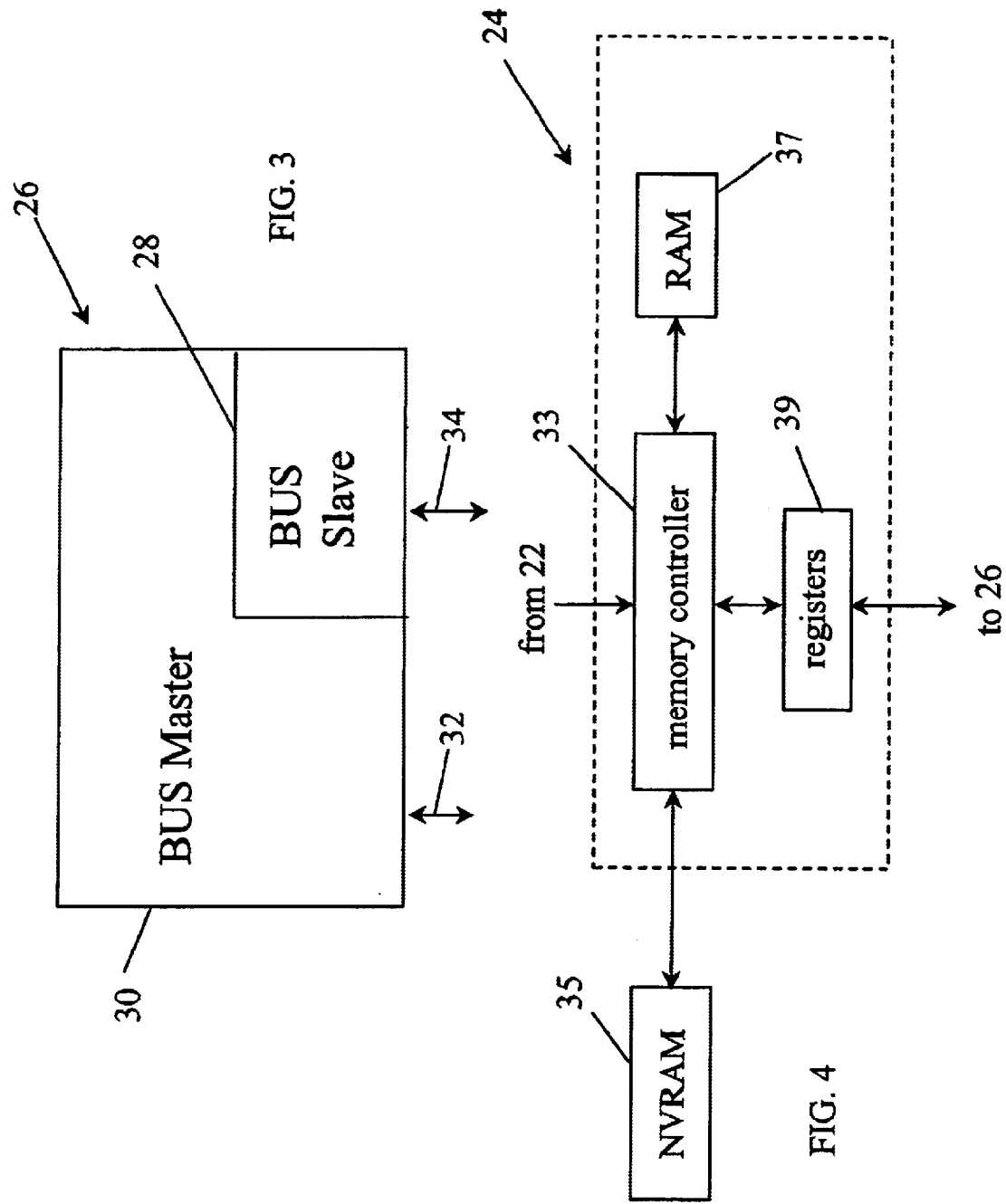

STACK-LESS, CPU-LESS CREATION OF VALID SNMP-TRAP PACKETS

BACKGROUND OF THE INVENTION

1. Field of the Invention

The invention pertains to the field of computer networking. In particular, the invention pertains to a method of reporting various events in a computer networking environment.

2. Description of Related Art

Currently devices, such as Personal Computers or PCs, can be connected over a network, such as an Ethernet network. To connect a PC to an Ethernet network, a network card, having an Ethernet controller with interfaces to the Internet and the PC, is required.

The Simple Network Management Protocol (SNMP) is a protocol used for managing a network and for monitoring networked devices and their corresponding functions and status. SNMP is well-known to those of ordinary skill in the art and is defined in "Request for Comments: 1157", by Network Working Group, J. Case, M. Fedor, M. Schoffstall and J. Davin, May 1990.

SNMP messages are sent in packets called Protocol Data Units (PDUs). There are five PDU types: get-request; get-next request; get-response; set-request; and trap.

The SNMP Trap PDU is for reporting the occurrence of particular events. The SNMP trap PDU types are:

1. coldstart: indicating that the sending protocol entity is reinitializing itself, such that the configuration or protocol entity may be altered;
2. warmstart: indicating that the sending protocol entity is reinitializing itself, such that neither the configuration nor protocol entity is altered;
3. linkdown: indicating that the sending protocol entity recognizes a failure in one of the communication links;
4. linkup: indicating that the sending protocol entity recognizes that one of the communication links has come up;
5. authenticationFailure: indicating that the sending protocol entity is the addressee of a protocol message that is not properly authenticated;
6. egpNeighborLoss: indicating that an EGP neighbor for whom the sending protocol entity was an EGP peer has been marked down and the peer relationship no longer exists; and
7. enterpriseSpecific: indicating that the sending protocol entity recognizes that an enterprise-specific event occurred.

FIG. 1 shows a generic SNMP packet 2. The SNMP packet 2 is typically enveloped in a User Datagram Protocol (UDP) packet 4. UDP is well-known to those of ordinary skill in the art and is described in "Request for Comments: 768", J. Postel, August 1980. UDP provides for the transmission of datagrams within an environment of an interconnected set of computer networks. UDP is transaction oriented and does not provide guaranteed delivery or duplicate protection.

Each UDP packet is enveloped in an Internet Protocol (IP) packet 6. IP is a datagram-oriented protocol which treats each packet independently. IP neither guarantees that packets reach their destination nor takes corrective action if they do not. IP is described in, "Internet Protocol DARPA Internet Protocol Specification", Request for Comments: 791", prepared for Defense Advanced Research Projects Agency by Information Sciences Institute, September 1981.

Each IP packet is enveloped in a Medium Access Control (MAC) layer packet 8. The MAC layer is well-known to those of ordinary skill in the art and specifies the rules of accessing a shared medium, such as the Ethernet. The MAC layer is described in the IEEE 802.3 standard specification, IEEE CSMA/CD Std 802.3, 1998 Edition 31. MAC Control 31.1, Institute of Electrical and Electronic Engineers.

When the PC detects an event which requires the generation of an SNMP packet, software on the PC constructs the SNMP packet. As shown above and in FIG. 1, the software must construct each of the SNMP trap PDU in an SNMP packet, the UDP packet, the IP packet and the MAC layer packet. That is, the PC must execute a separate network layer software stack to build each protocol layer of the message for transmission over the network.

Some of the disadvantages of this method of building and sending SNMP trap PDUs are:

1. the PC must execute full network layer software stacks for each protocol layer in order to build a message containing the SNMP trap PDU and all other required protocol layer packets necessary for sending the SNMP trap PDU over the network; and
2. when the PC is experiencing low power or the operating system is hung, the PC will be unable to execute the software which is necessary to build and send a message containing the SNMP trap PDU.

SUMMARY

In an embodiment of the invention, data, including static fields, for a packet template is received. The packet template is stored into a memory. An indication of an event to be reported is received and a packet, which includes non-static information and is based on the stored packet template and the indication, is generated. The generated packet is sent to a communication controller for transmission over a shared medium.

More particularly, when an SNMP trap PDU is generated, most of the fields of the SNMP trap PDU, the UDP datagram packet, the IP datagram packet and the MAC layer packet remain fixed or static when a particular trap type/event indication strategy is employed. An embodiment makes use of this fact by utilizing a packet template having values preset into each of the static fields.

An embodiment of the invention includes a device, such as an Application Specific Integrated Circuit (ASIC) which has memory, such as a RAM and access to a non-volatile RAM (NVRAM) or Electrically Erasable Programmable Read Only Memory ($E^2$PROM). The ASIC may reside in a PC or on a network interface card for providing an interface between the PC and a network, such as the Ethernet.

Software on the PC constructs a base packet or template for an SNMP trap PDU and stores the template into the NVRAM or $E^2$PROM. When the ASIC determines the need to generate and send the SNMP trap PDU, the ASIC can, without a CPU and without a full implementation of the network layer software stacks, generate the SNMP trap PDU based on the packet template stored in the NVRAM of the ASIC. The ASIC need only insert the non-static data into a packet built from the packet template before sending the packet to a communication controller for transmission over the network.

Thus, SNMP trap packets may be generated and sent under low power conditions or when the PC operating system is hung.

BRIEF DESCRIPTION OF THE DRAWINGS

The present invention will be understood and appreciated more fully from the following detailed description, taken in conjunction with the drawings in which:

FIG. 3 a detailed view of bus control;

FIG. 4 shows a detailed view of template storage;

DETAILED DESCRIPTION

Figure 1:
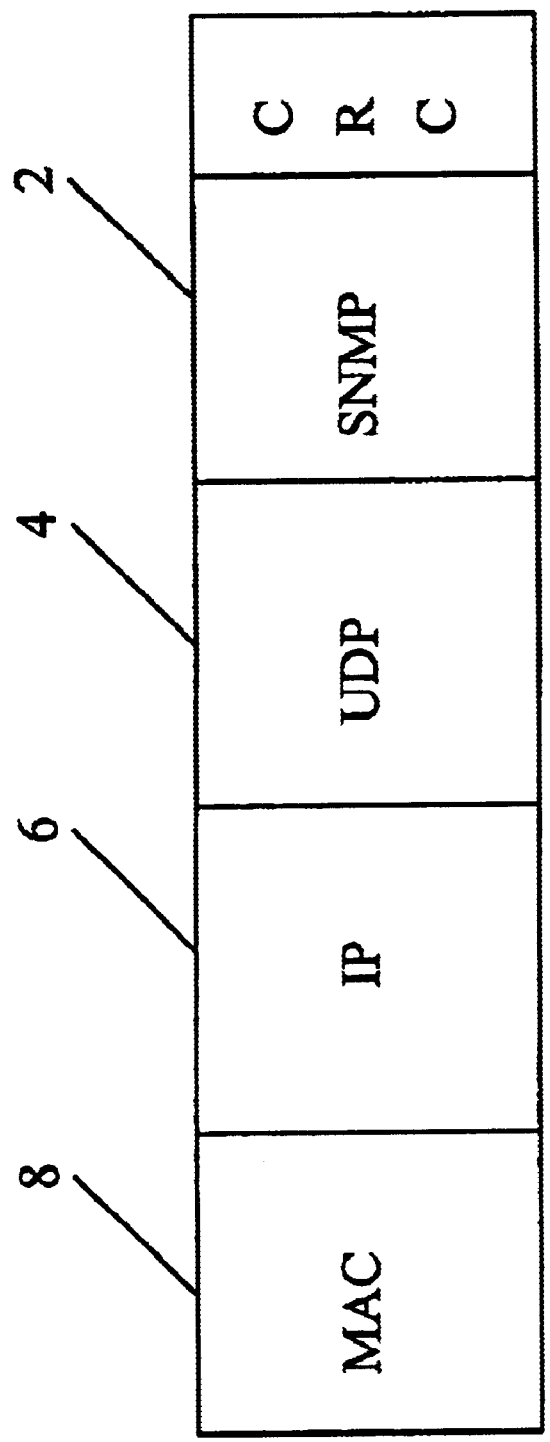
FIG. 1 shows the packet format of a packet which includes an SNMP packet.
Figure 2:
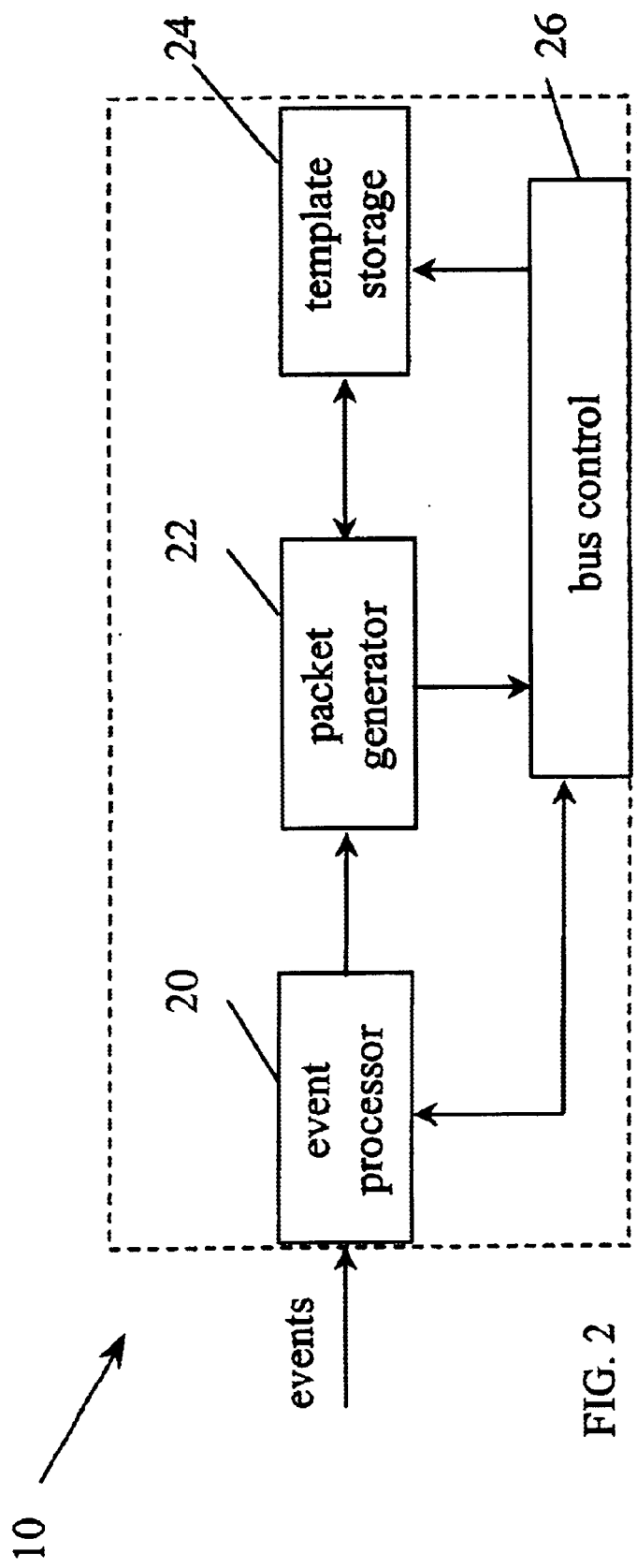
FIG. 2 is a system level block diagram showing a first embodiment of the invention.

FIG. 2 provides a block diagram of an embodiment of the invention in the form of an IC 10, in this case, an Application Specific Integrated Circuit (ASIC). The IC 10 comprises an event processor 20, for receiving an indication of an event, a packet generator 22, for receiving an event code and event data from the event processor and for accessing a packet template via template storage 24, to generate a packet including an SNMP Trap PDU packet, based on the packet template stored in template storage 24. The packet generator sends the packet through bus control 26 to a communication controller for transmission over a shared medium, such as an ethernet network.

FIG. 3 show the bus control 26 in more detail. The bus control 26 comprises a bus slave 28 and a bus master 30. The bus master is arranged to communicate over a first bus 32 to a communication controller and over a second bus 34 to one or more devices. The bus master originates communication to the communication controller. The bus slave 28 is arranged to respond to communication requests over the second bus 34 with one or more other devices. The devices attached to the second bus 34 are, for example, a CPU, a temperature monitoring device, for example a Maxim MAX1617, by Maxim Integrated Products, for monitoring CPU temperature, an environmental monitor, for example a National LM81, by National Semiconductor Corporation, or a voltage monitor. The voltage monitor may be used to detect chassis intrusion.

The first and second bus 32, 34, respectively, both use one bit each for transmit and receive. One such bus is a System Management Bus, as specified in the System Management Bus Specification, revision 1.1, Dec. 11, 1998, published on the Internet at <http://www.sbs-forum.org/smbus/specs/index.html>.

FIG. 4 shows the template storage 24 in more detail. The template storage 24 comprises a memory controller 33, which can be accessed by the packet generator 22, registers 39, for holding configuration information and for receiving and sending data, RAM 37 and access to NVRAM 35.

Figure 5:
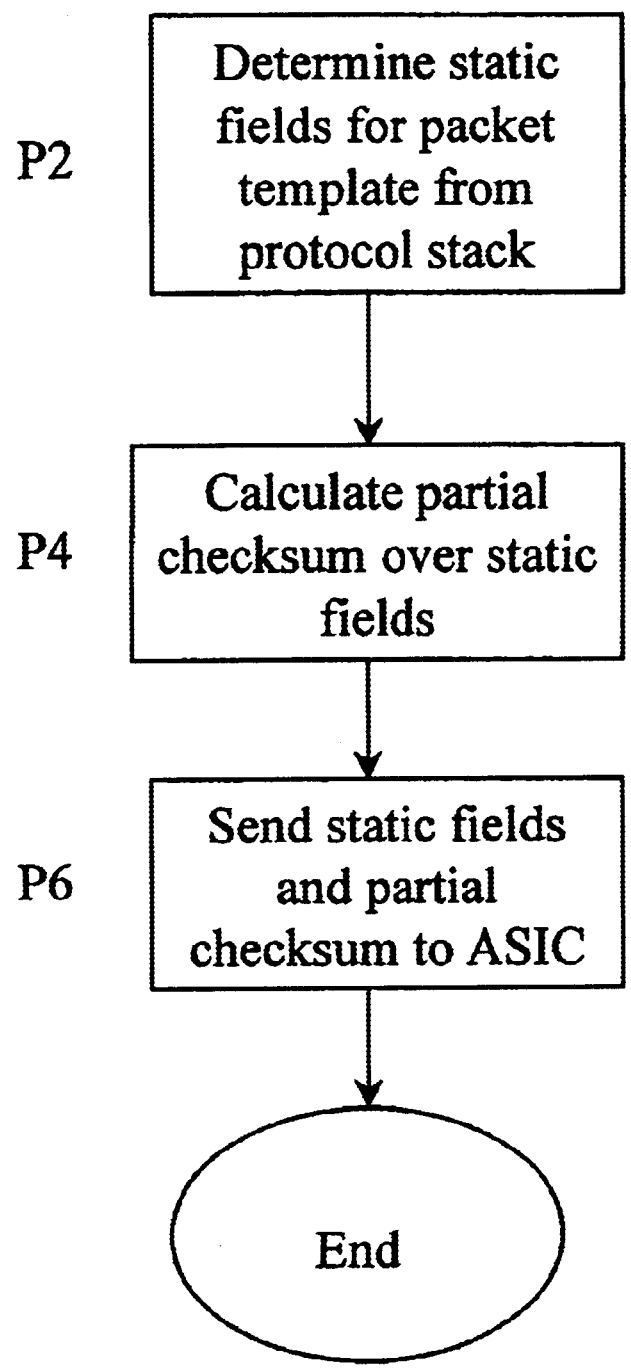
FIG. 5 is a flowchart which explains the processing for determining a packet template.

FIG. 5 explains the processing that takes place on the CPU connected to the second bus interface 34. At P2, the static fields of the packet template are determined, as explained below. At P4, a partial checksum is calculated over the static fields of the UDP packet and the SNMP Trap PDU packet. At P6, the CPU transmits the packet template and the partial checksum over the second bus interface 34 to the bus slave 28.

How the software on the CPU determines the static fields in an embodiment of the invention is described with reference to Table 1. As described in Table 1, Destination Address can be determined by, for example, executing a "ping" operation, using, for example, the Windows NT or Windows95 Operating Systems by Microsoft Corporation of Redmond, Wash. (Windows NT and Windows are registered trademarks of the Microsoft Corporation). Source Address can be determined by communicating with the network driver via an IOCTL, which is a standard way of communicating to a driver. Version is hardcoded to 4, as described in RFC 791. IHL is hardcoded to, for example, 20 and Type of Service is hardcoded to, for example, 4. Total Length is calculated based on the size of the whole length of the packet. Identification and Flags are determined based upon RFC 791. Fragment Offset is hardcoded to zero. Time to Live can be changed by routers. Protocol is hardcoded to UDP. Header Checksum can be changed by routers. Source Address can be determined by Operating System Calls, enumerating the different network interfaces and identifying IP addresses associated with each interface. This could be done, for example, using the ipconfig utility on Windows NT, for example. Destination Address is determined based on data provided by the user. Destination Address indicates where alerts are to be sent. Source Port is whatever port is assigned by the Operating System as part of a bind call. Destination Port is the port number specified by the user. Length is calculated based on the size of the packet. Checksum depends of the UDP and SNMP data. Total Packet Length depends on the length of the packet and is hardcoded. Type Version is set to 2. Type Community String is a value which indicates an octet string. It is hardcoded to 4 as described in RFC 1157. Length of Community String is the length of the actual community string provided by the user. Community String is the actual community string provided by the user. Type Trap PDU is hardcoded per RFC 1157. Length of Trap PDU is calculated to equal the length of the trap packet. Type Enterprise is hardcoded per RFC 1157. Length of Enterprise is calculated based on the length of the object identifier. Enterprise is set to indicate the actual object identifier. Type IP Address indicates the IP Address of the sender as the type, for example, 40. Length of IP Address is hardcoded indicating that the length of the IP address field is 4. IP Address is similar to the source IP address field and is determined from the operating system. Type Trap Type is to indicate that the type is integer. Length of Trap Type is to indicate the length of the type, in this case 1. Trap Type is to 6 to indicate that the Trap Type is enterprise specific. Type Specific Trap Type is to indicate that the type is integer. Length of Specific Trap Type is to indicate the length of the type, for example, 3. The Specified Trap Type is the specified value for the MIB. Type Timestamp is to, for example, 43 to indicate that the type is timestamp. Length of Timestamp is to indicate the length of the timestamp. Timestamp is set based on a value of a timer. Type Sequence is set to, for example 30. Length of Sequence is depends on the particular MIB and is fixed with respect to the particular MIB. Sequence is set depending on the sequence number. Variable bindings is specific to a particular MIB.

Figure 6:
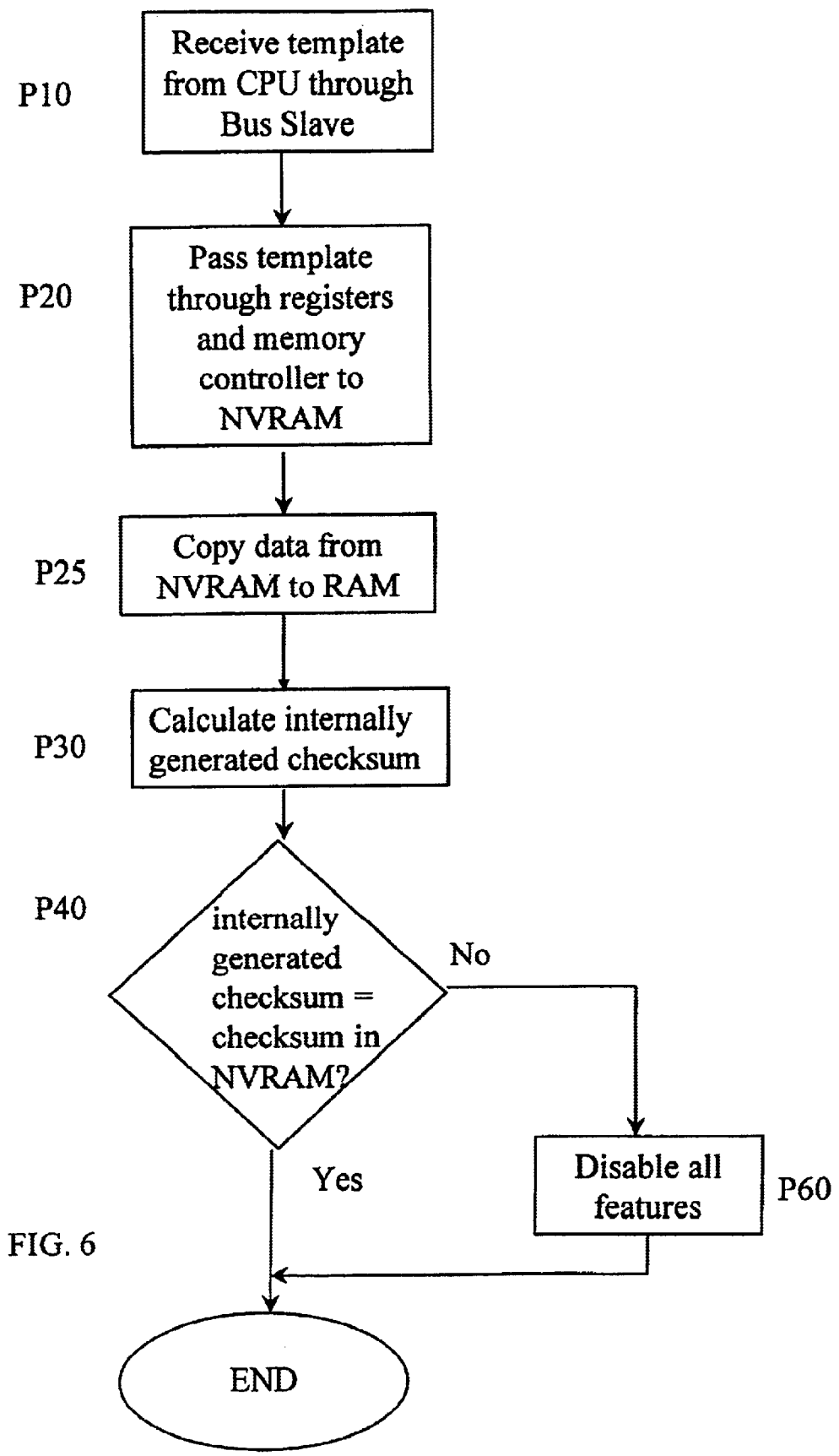
FIG. 6 is a flowchart for explaining the processing that takes place when the packet template is received.

FIG. 6 explains the processing which takes place on the ASIC 10. At P10, the ASIC 10 receives the template and partial checksum over the second bus 34 into the bus slave 28. At P20, the packet template and partial checksum are passed through the registers 39 and the memory controller 33 to NVRAM 35. At P25, the template and partial checksum are copied from NVRAM 35 to RAM 37 through the memory controller 33. At P30, an internally generated checksum is calculated for the contents of the template stored in RAM 37 At P40, the internally generated checksum and the partial checksum, in NVRAM 35, are compared. If the two checksums do not match, P60 is performed to disable all features of the ASIC 10.

Table 1, below, shows the details of the packet and indicates which fields are unchanging or static. As can be seen from the table, all fields are static with the exception of the UDP checksum, timestamp, sequence, and in some circumstances variable bindings. However, the invention is not limited to the particular dynamic and static field arrangement shown in Table 1. For example, the Specific Trap Type field may be a dynamic field.

Figure 7:
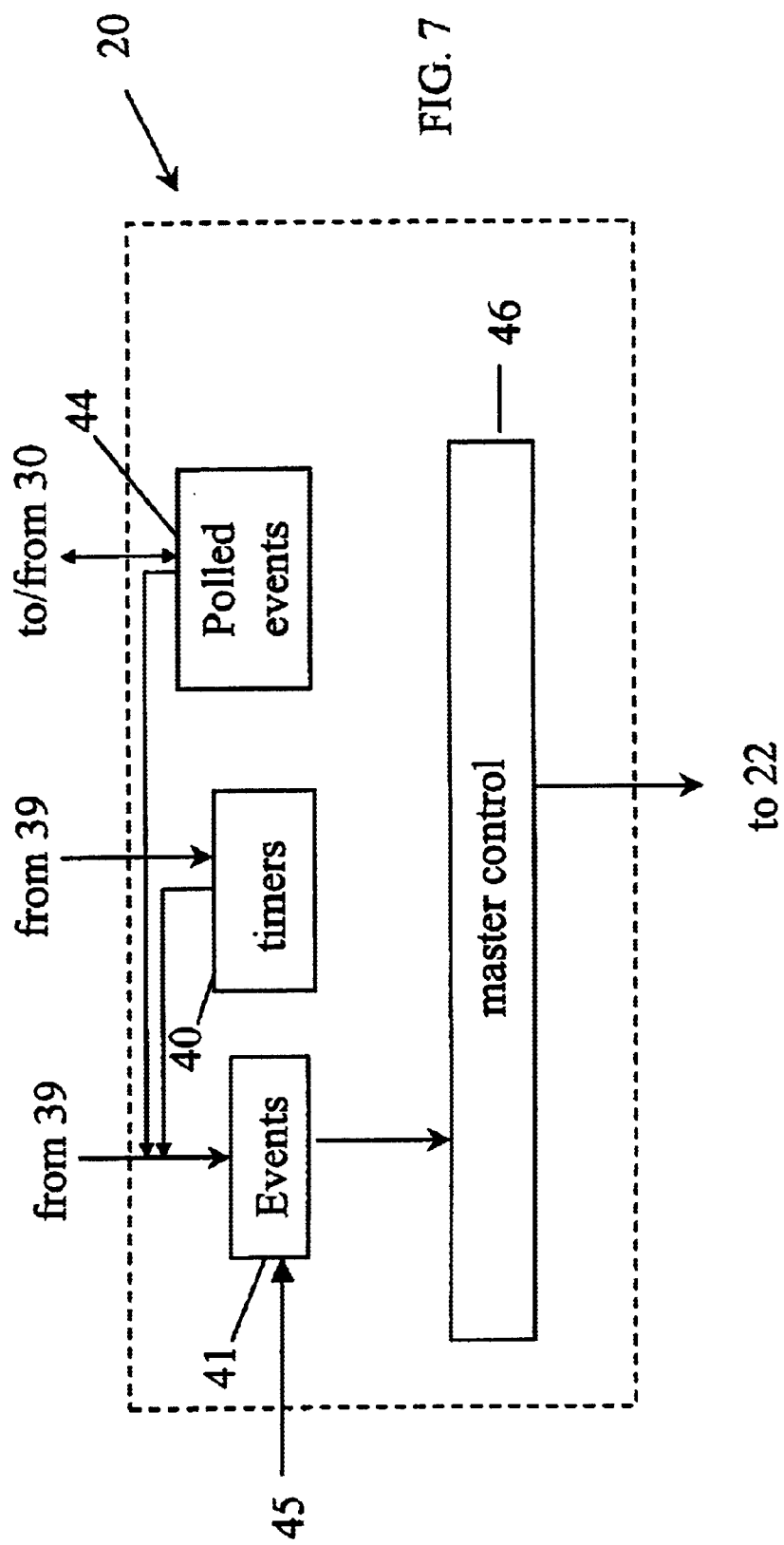
FIG. 7 is a detailed view of the Event Processor.

FIG. 7 provides a more detailed view of the event processor 20. External events arrive into the ASIC 10 over an event bus 45 to the events block 41. Examples of external events include, but are not limited to: a network link lost event, indicating that the link to a network, such as an Ethernet, is down; a temperature out of specification event, indicating that the CPU temperature is outside of a predetermined range; a fan speed out of specification event; a CPU missing/removed event, indicating that the CPU has been removed; and a chassis intrusion event.

The timers block 40 includes a watchdog timer. During normal operations, software executing on the CPU sends a command over the second bus 34 to the bus slave 28 through the registers 39 to the watchdog timer in the timers block 40. The command must be sent every predetermined time period, preferably every 5 minutes. If the command is not sent by the CPU before the expiration of the predetermined time period, the watchdog timer expires, causing an indication to be sent from the timer block 40 to the events block 41, thus causing an event to be generated.

Software executing on the CPU can cause software-generated events. The software can cause such an event by sending a command over the second bus 34 to the bus slave 28 through the registers 39 to the events block 41, which will generate an event by passing an

TABLE 1

| Contents | Length | Static | Detail |
| --- | --- | --- | --- |
| MACC | | | |
| Destination Address | 6 bytes | Yes | This address is retrieved on Windows NT and 95 by running a "ping" |
| Source Address | 6 bytes | Yes | This address is filled in by communicating with the network driver via an IOCTL (this is the standard way of communicating to a driver). |
| IP (VERSION 4) | | | |
| Version | 4 bits | Yes | This is hard coded and filled in per RFC - 791 (IP RFC) |
| IHL | 4 bits | Yes | Hard coded to, for example, 20 |
| Type of Service | 1 byte | Yes | Hard coded per RFC 791 to 4 |
| Total Length | 2 bytes | Yes | Calculated based on size of the whole length of the packet by software |
| Identification | 2 bytes | Yes | Hard coded based on RFC |
| Flags | 3 bits | Yes | Hard coded based on RFC |
| Fragment Offset | 13 bits | Yes | Hard coded to 0 |
| Time to Live | 1 byte | Yes | Can be changed by routers |
| Protocol | 1 byte | Yes | Hard code to UDP |
| Header Checksum | 2 bytes | Yes | Can be changed by routers |
| Source Address | 4 bytes | Yes | Determined via Operating system calls, enumerating the different network interfaces and identifying IP addresses associated with each interface. This could be done by running the ipconfig, utility on Windows NT as an example |
| Destination Address | 4 bytes | Yes | Filled in based on data provided by the user. The user specifies the destination address of where the alerts need to go to. |
| UDP | | | |
| Source Port | 2 bytes | Yes | This is a no-op. Whatever port is assigned by the OS as part of the bind call is used. |
| Destination Port | 2 bytes | Yes | This is the port number specified by the user, which is used to determine the entity at the destination that receives these packets. |

TABLE 1-continued

| Contents | Length | Static | Detail |
| --- | --- | --- | --- |
| Length | 2 bytes | Yes | Calculated based on the size of this packet. |
| Checksum | 2 bytes | No | Dependent on UDP & SNMP data |
| S | | | |
| Total Packet Length | 1 byte | Yes | Hard coded, based on the length of the packet. |
| Type Version | 1 byte | Yes | Set to 2 |
| Length of Version | 1 byte | Yes | Set to 1 |
| Version | N bytes | Yes | Set to 0 |
| Type Community String | 1 byte | Yes | Value to indicate type = octet string |
| Length of Community String | 1 byte | Yes | Length of the actual string that is provided by the user . . . e.g. "public", which is a commonly used string |
| Community String | N bytes | Yes | The actual string itself, that is provided by the user. |
| Type Trap PDU | 1 byte | Yes | per SNMP RFC indicating that the packet is of type "Trap" |
| Length of Trap PDU | 1 byte | Yes | Calculated to equal the length of this trap packet |
| Type Enterprise | 1 byte | Yes | Hardcoded per SNMP RFC to indicate a parameter of type = OID (Object identifier). E.g. of an object identifier would be 1.3.1.4.1.3183.1.1, which is the OID for PET |
| Length of Enterprise | 1 byte | Yes | Calculated based on the length of the object identifier. |
| Enterprise | N bytes | Yes | The actual OID itself |
| Type IP Address | 1 byte | Yes | per SNMP RFC spec. Indicating IP address of sender as the type of the next field. Value = 40. |
| Length of IP Address | 1 byte | Yes | per SNMP RFC indicating length of the IP address field = 4 |
| IP Address | 4 bytes | Yes | Determined from the operating system — similar to the source IP address field. |
| Type | 1 byte | Yes | per SNMP to indicate that the type is integer |
| Length of Type | 1 byte | Yes | per SNMP to be equal to the length of the Type = integer, in this case 1. |
| Trap Type | N bytes | Yes | to 6- to indicate Enterprise specific trap. |
| Type Specific Trap Type | 1 byte | Yes | per SNMP to indicate that the type is integer |
| Length of Specific Trap Type | 1 byte | Yes | per SNMP to equal to length of the type, in this case 3. |
| Specific Trap Type | N bytes | Yes | Specified value per the MIB for the trap. |
| Type Timestamp | 1 byte | Yes | per SNMP to indicate a type = Timestamp, in this case 43 |
| Length of Timestamp | 1 byte | Yes | per SNMP to indicate the length of the timestamp. |
| Timestamp | 4 bytes | No | Specified per SNMP the value of the timer — Dependent on timer |
| Type Sequence | 1 byte | Yes | For example, 30 which specifies type sequence |
| Length of Sequence | 1 byte | Yes | Specific to a particular MIB |
| Sequence | 1 byte | No | Dependent on packet sequence # |
| Variable Bindings | N bytes | Yes/No | Specific to a particular MIB | event code, event data and any other required data to the packet generator 22, as described earlier.

The polled events block 44, every predetermined period, for example, every five seconds, causes a command to be sent to the bus master 30 to at least one specific device on the second bus 34. The command, for example, requests the specific device to send the contents of particular memory locations of the device over the second bus 34 via the bus master 30 to the polled events block 44. The contents of the particular memory locations are indicative of the status of the specific device. If the returned contents are determined to show an error status, then polled events block 44 provides an error indication to the events block 41 so that an event will be generated.

Figure 8:
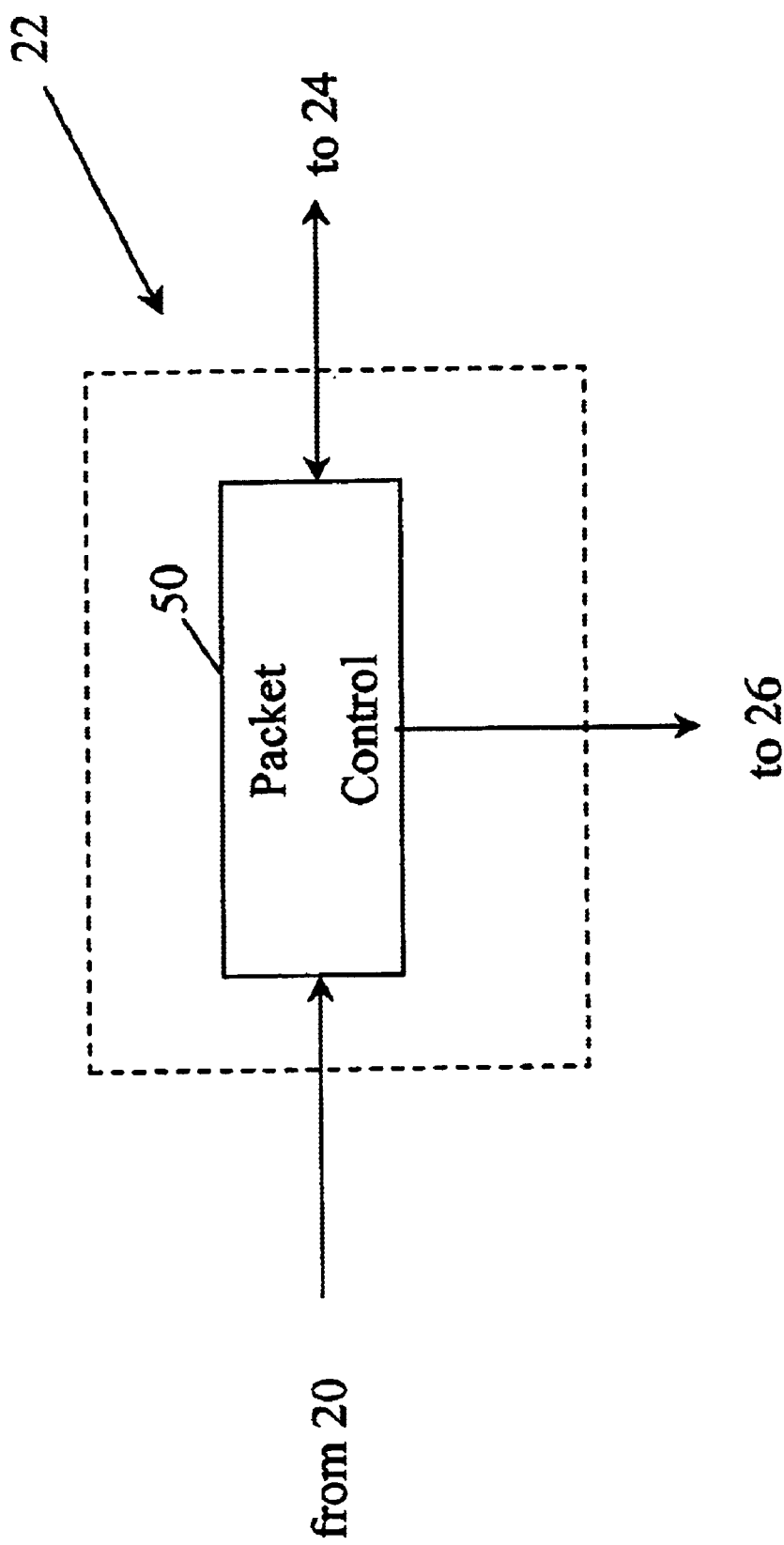
FIG. 8 is a detailed view of the packet generator.

FIG. 8 provides a more detailed view of the packet generator 22. Data from the event processor 20, including but not limited to an event code and event data, are sent to packet control 50 within the packet generator 22. Packet control 50 accesses template storage in order to include the event code and event data into the packet template and causes the packet template to be transmitted over the first bus 32, via the bus master 30, to the communication controller.

Figure 9:
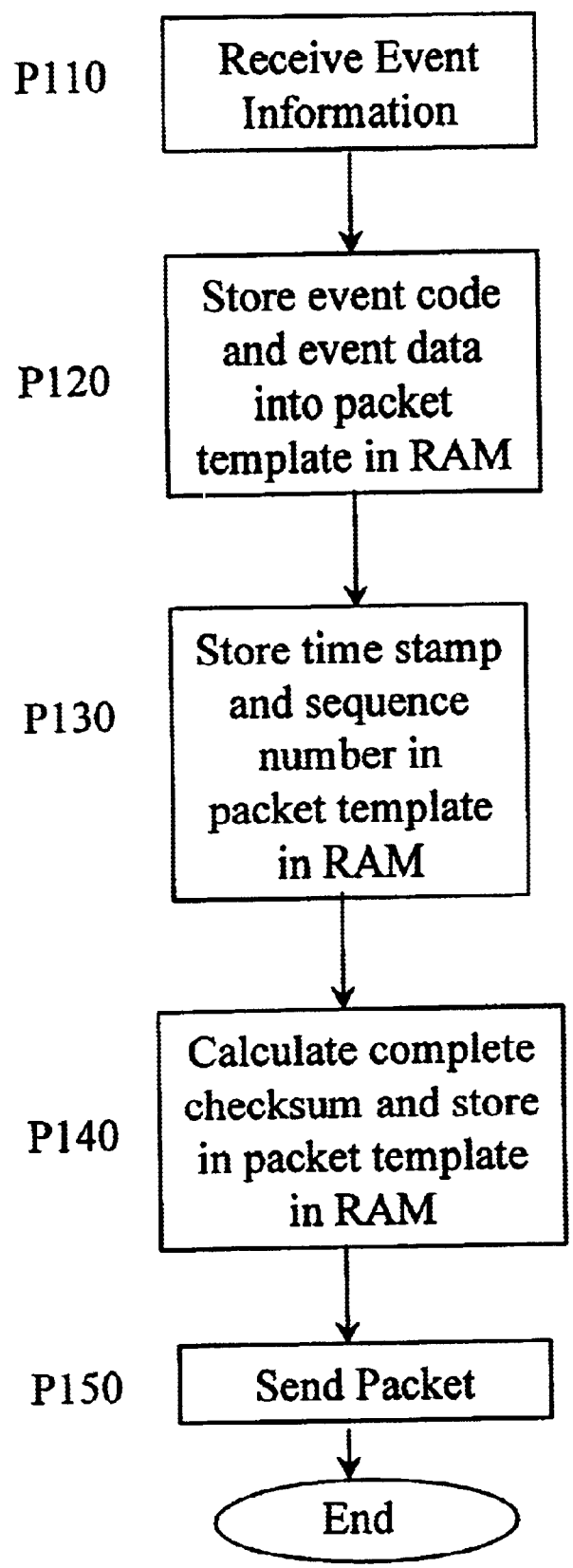
FIG. 9 is a flowchart for explaining the processing of the packet generator.

FIG. 9 describes the processing performed by the packet generator 22. At P110, the packet control 50 receives at least an event code and event data from the event processor 20. At P120, packet control 50 passes the event data and event code to template storage 24, through the memory controller 33 to store the event code and event data in the packet template in RAM 37. Event code and event data are preferably stored in the variable bindings field of the template. The ASIC 10 maintains a timer which is used to form a timestamp. At P130, packet control 50 accesses the timer, forms the time stamp, increments a sequence umber and inserts the time stamp into the timestamp field and the sequence number into the sequence field of the template stored in RAM 37 of template storage 24. At P140, packet control accesses the template in RAM 37 to calculate a complete checksum, based on the partial checksum in template storage 24 and the dynamic fields of the UDP packet and the SNMP Trap PDU portions of the template. Packet control 50 stores the complete checksum into the checksum field of the UDP portion of the packet template. At P150, packet control causes the packet to be sent to the bus master 30 of bus control 26 for transmission over the first bus 32 to the communication controller, which subsequently transmits the packet over a shared medium, such as the Ethernet.

Figure 10:
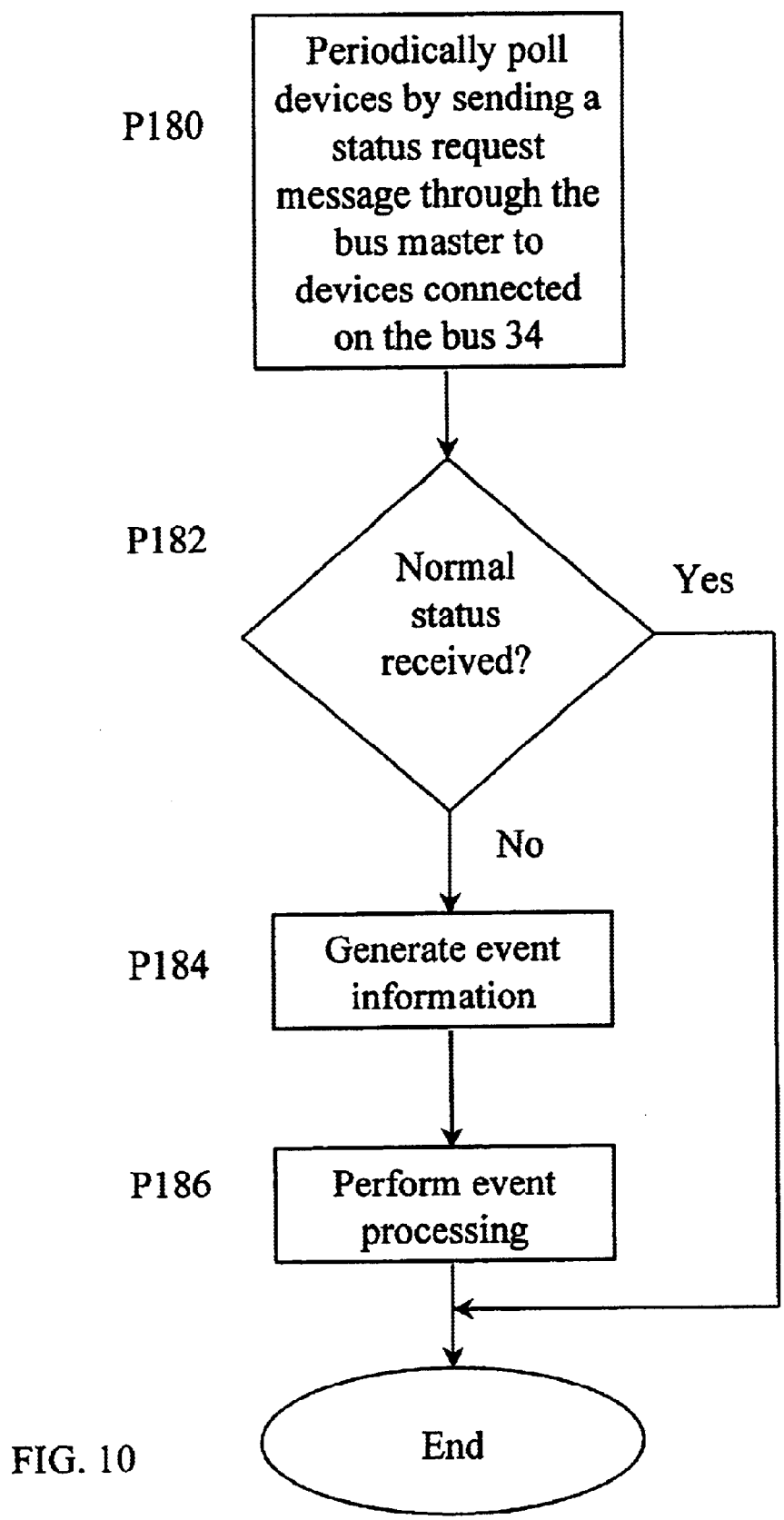
FIG. 10 is a flowchart for explaining the processing of the polled events block.

FIG. 10 illustrates the processing which occurs when polling devices. At P180, devices on the second bus 34 are periodically polled, for example, every five seconds, by a command sent through the bus master 30 over the second bus 34 to each of the specific devices. The command is a command which, for example, commands the specific device to return a content of a portion of memory of the specific device. The content of the memory is indicative of a status of the specific device. At P182, the returned content is examined to determine if the specific device has a normal status. If the specific device is determined to have a normal status, nothing more needs to be done for the device until the next polling time. Otherwise, at P184, an indication is sent to the events block 41 indicating an event for reporting. At P186, The events block 41 then sends an event code and event data, as well as any other required information, to the packet generator 22, which then causes the packet, including the SNMP Trap PDU to be sent via the bus master 30 and the first bus 32 to the communication controller for transmission over the shared medium, for example, the Ethernet.

Figure 11:
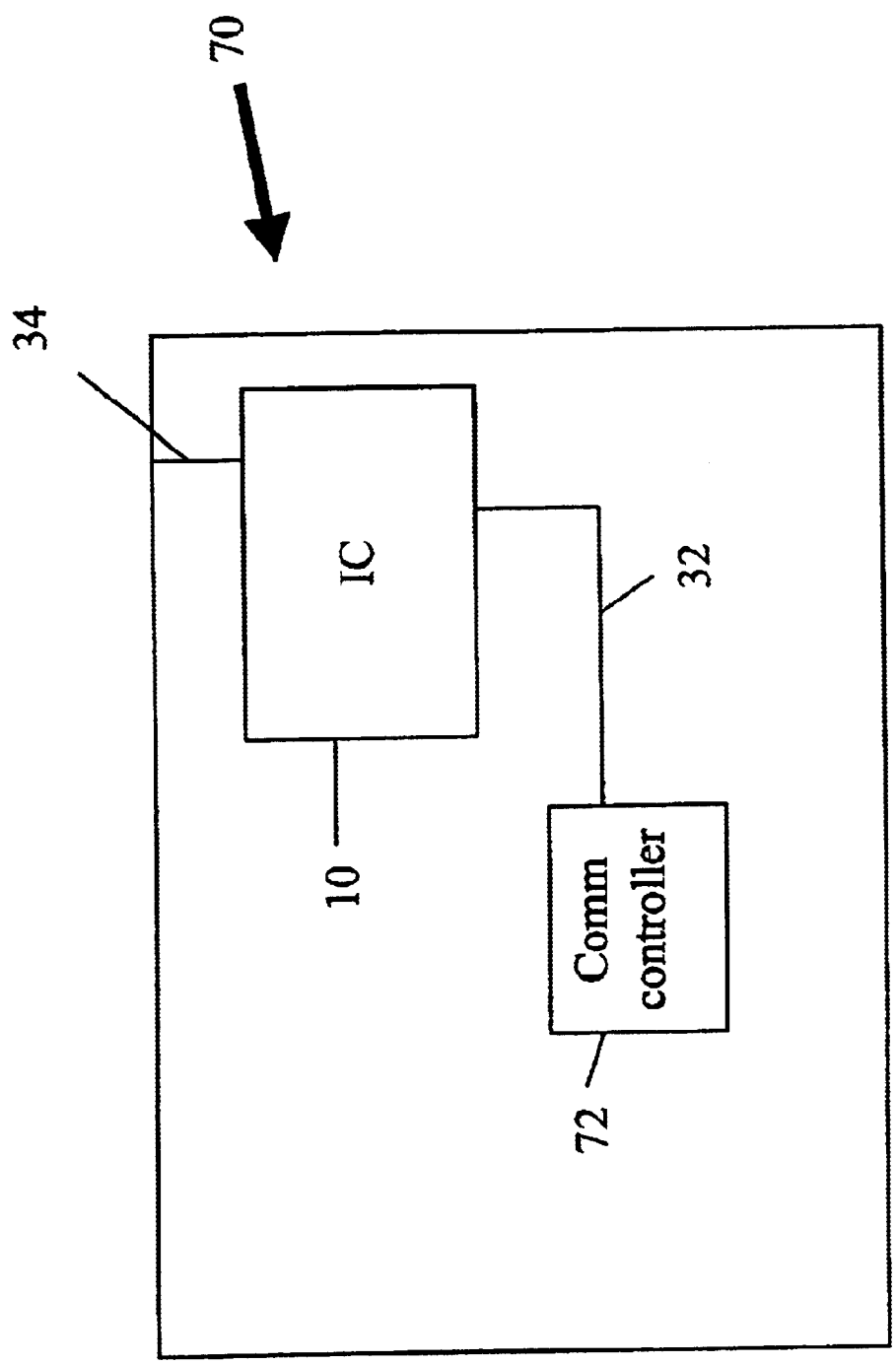
FIG. 11 shows an embodiment of the invention on a network card.

FIG. 11 illustrates the IC 10 embodied in a network card 70. The IC 10 he a first bus 32 connected to a communication controller 72, for example, an Ethernet communication controller. The IC 10 has a second bus 34 available to connect to monitoring devices.

Figure 12:
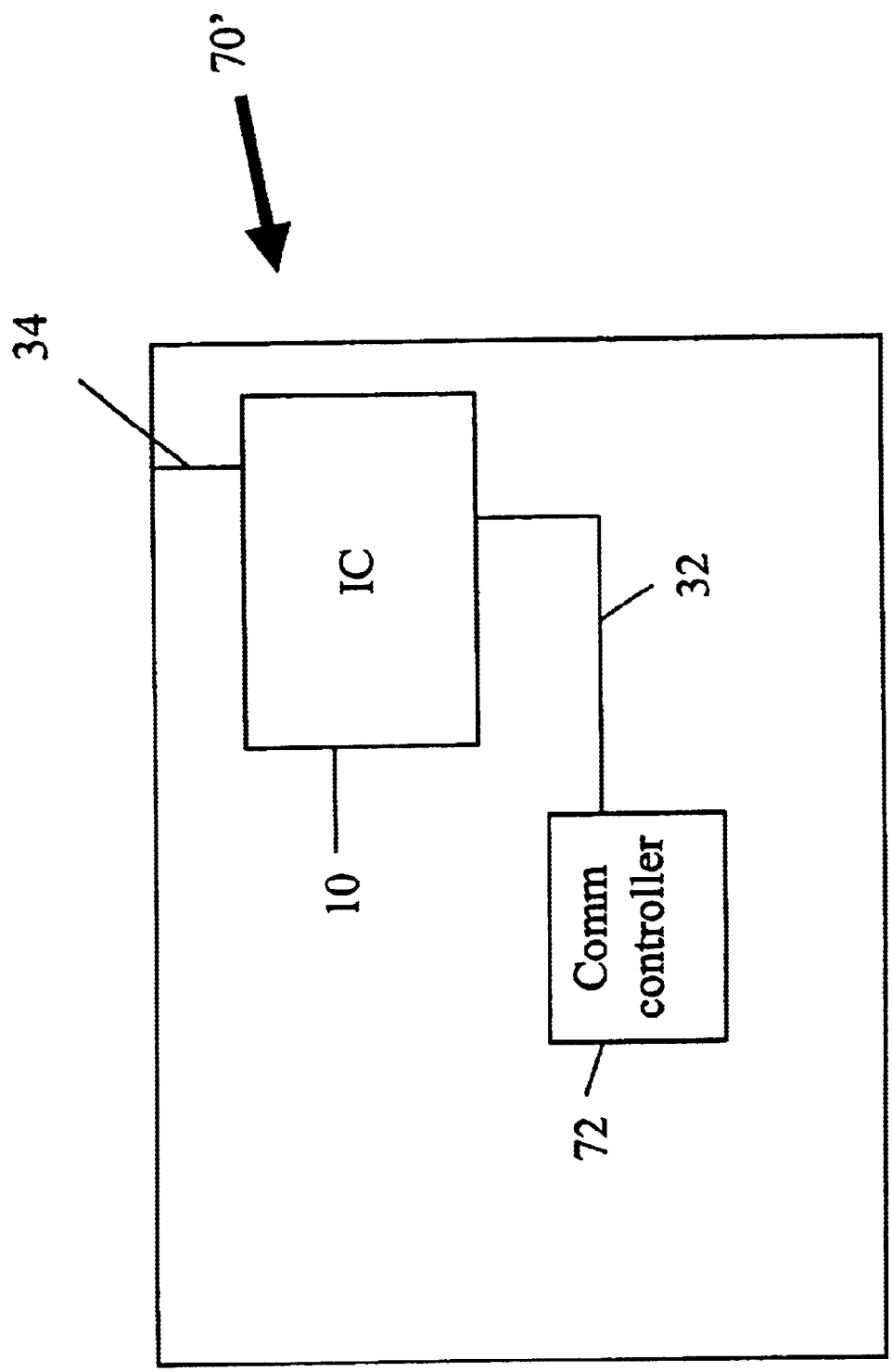
FIG. 12 shows an embodiment of the invention on a motherboard.

The invention can also be embodied in a motherboard 70', as shown in FIG. 12.

The invention has the following advantages:
1. the PC and the IC 10 need not execute full network layer software stacks for each protocol layer in order to build a message containing the SNMP trap PDU; and
2. If the PC is experiencing low power or the operating system is hung, the IC 10 will still be able to build and send a message containing the SNMP trap PDU to the communication controller for transmission over a shared medium.

It will be appreciated by persons skilled in the art that the present invention is not limited by what has been particularly shown and described hereinabove. Rather the scope of the present invention is defined only by the claims which follow.

We claim as our invention:

1. A method, comprising:
   receiving data to be used as a packet template;
   generating the packet template, wherein the packet template includes at least two protocol layers, one of which is an SNMP protocol layer, and each of the protocol layers include at least two static fields, and each of the at least two static fields have a preset value;
   storing said packet template into a memory;
   receiving an indication of an event to be reported;
   generating a packet based on said stored packet template and said indication independently of a host system and without execution of a software stack for each of the protocol layers, said generated packet including non-static information; and
   sending said generated packet to a communication controller for transmission over a shared medium.

2. The method of claim 1, further comprising:
   calculating a partial checksum over said static fields of said packet template, wherein:
      said receiving of said data includes said partial checksum, and
      said storing of said packet template comprises storing said partial checksum in said memory, and
      said generating said packet comprises calculating a complete checksum, said complete checksum being based on said partial checksum and said non-static information, said complete checksum being included as part of said generated packet.

3. The method of claim 2, wherein said generated packet includes a Simple Network Management Protocol (SNMP) trap Protocol Data Unit (PDU).

4. The method of claim 3, wherein:
   said complete checksum is inserted into a User Datagram Protocol (UDP) packet included in said generated packet.

5. The method of claim 4, wherein said complete checksum is based on information in said User Datagram Protocol (UDP) packet and said Simple Network Management Protocol (SNMP) trap Protocol Data Unit (PDU).

6. The method of claim 2, wherein said generating said packet further comprises:
   storing an event code and event data into said generated packet, said event code and said event data being based on said indication.

7. The method of claim 1, wherein said generated packet includes a Simple Network Management Protocol (SNMP) trap Protocol Data Unit (PDU).

8. The method of claim 7, wherein said generating said packet further comprises:
   storing an event code and event data into said generated packet, said event code and said event data being based on said indication.

9. The method according to claim 1, further comprising:
   polling at least one device over a bus;
   receiving a polling response from said at least one device; and
   generating said indication of said event to be reported based on said polling response.

10. The method of claim 1, further comprising:
    maintaining a watchdog timer, an expiration of said watchdog timer causing said indication of an event for reporting.

11. The method of claim 1, wherein the at least two protocol layers of the packet template include a User Datagram Protocol (UDP) layer, an Internet Protocol (IP) layer, and a Simple Network Management Protocol (SNMP) layer.

12. The method of claim 11, wherein the at least two protocol layers of the packet template include a MAC layer.

13. The method of claim 12, wherein the at least two static fields include a destination address and a source address, each stored within the MAC layer.

14. The method of claim 11, wherein the at least two static fields include at least "Version," "IHL," and "Flags," each stored within the IP layer.

15. The method of claim 11, wherein the at least two static fields include at least "Source Port," "Destination Port," "Length," and "Checksum" stored within the UDP layer.

16. The method of claim 11, wherein the at least two static fields include at least "Total Packet Length," "Type Version," and "Length of Version," each stored within the SNMP layer.

17. A method, comprising:
storing, into a memory, data to be used as a packet template;
generating the packet, wherein the packet template includes at least two protocol layers, one of which is an SNMP protocol layer, and each of the protocol layers include at least two static fields, and each of the at least two static fields have a preset value;
receiving an indication of an event to be reported;
generating a packet, including non-static information, based on said previously stored packet template and said indication independently of a host system and without execution of a software stack for each of the protocol layers; and
sending said generated packet to a device for transmission over a shared medium.

18. The method of claim 17, wherein:
said storing of said packet template comprises storing a previously calculated partial checksum in said memory, and
said generating said packet comprises calculating a complete checksum, said complete checksum being based on said partial checksum and said non-static information, said complete checksum being included as part of said generated packet.

19. The method of claim 18, wherein said generated packet includes a Simple Network Management Protocol (SNMP) trap Protocol Data Unit (PDU).

20. The method of claim 19, wherein:
said complete checksum is inserted into a User Datagram Protocol (UDP) packet included in said generated packet.

21. The method of claim 20, wherein said complete checksum is based on information in said User Datagram Protocol (UDP) packet and said Simple Network Management Protocol (SNMP) trap Protocol Data Unit (PDU).

22. The method of claim 18, wherein said generating said packet further comprises:
storing an event code and event data into said generated packet, said event code and said event data being based on said indication.

23. The method of claim 17, wherein said generated packet includes a Simple Network Management Protocol (SNMP) trap Protocol Data Unit (PDU).

24. The method of claim 23, wherein said generating said packet further comprises:
storing an event code and event data into said generated packet, said event code and said event data being based on said indication.

25. The method of claim 17, wherein said memory is Non-Volatile Random Access Memory (NVRAM).

26. The method of 17, further comprising:
maintaining a watchdog timer, an expiration of said watchdog timer causing an indication of an event to be reported.

27. The method of claim 17, wherein the at least two protocol layers of the packet template include a User Datagram Protocol (UDP) layer, an Internet Protocol (IP) layer, and a Simple Network Management Protocol (SNMP) layer.

28. The method of claim 27, wherein the at least two protocol layers of the packet template include a MAC layer.

29. An integrated circuit, comprising:
a storage to store a packet template;
a packet template generator to generate the packet template, wherein the packet template includes at least two protocol layers, one of which is an SNMP protocol layer, and each of the protocol layers include at least two static fields, and each of the at least two static fields have a preset value;
a packet generator to generate a packet, based on the stored packet template and including information of an event, independently of a host system and without execution of a software stack for each of the protocol layers, said packet generator being configured to send the packet to a communication device for communicating over the shared medium; and
an event processor to receive an indication of the event and inform the packet generator to generate the packet.

30. The integrated circuit of claim 29, wherein:
the packet template includes a partial checksum calculated over a plurality of static fields of the packet template,
said storage is configured to store the packet template and the partial checksum in a non-volatile storage, and
said packet generator comprises a complete checksum calculator for calculating a complete checksum, the complete checksum being based on the partial checksum and the information of the event, the complete checksum being included in the generated packet.

31. The integrated circuit of claim 30, wherein the generated packet includes a Simple Network Management Protocol (SNMP) trap Protocol Data Unit (PDU).

32. The integrated circuit of claim 31, wherein:
said packet generator inserts the complete checksum into a User Datagram Protocol (UDP) packet included in the generated packet.

33. The integrated circuit of claim 32, wherein said complete checksum is based on information in said User Datagram Protocol (UDP) packet and said Simple Network Management Protocol (SNMP) trap Protocol Data Unit (PDU).

34. The integrated circuit of claim 30, wherein said packet generator stores an event code and event data into the generated packet, the event code and the event data being based on the indication.

35. The integrated circuit of claim 29, wherein the generated packet includes a Simple Network Management Protocol (SNMP) trap Protocol Data Unit (PDU).

36. The integrated circuit of claim 29, wherein said storage stores the packet template in a RAM.

37. The integrated circuit of claim 29, further comprising:
a watchdog timer, an expiration of said watchdog timer causing the indication of an event.

38. The integrated circuit of claim 29, wherein the at least two protocol layers of the packet template include a User Datagram Protocol (UDP) layer, an Internet Protocol (IP) layer, and a Simple Network Management Protocol (SNMP) layer.

39. The integrated circuit of claim 38, wherein the at least two protocol layers of the packet template include a MAC layer.

40. A board for a computer, said board comprising:

a communication controller; and an integrated circuit configured to communicate to a monitoring device through a second interface and to said communication controller through a first interface, wherein said integrated circuit comprises:

an event processor configured to receive an indication of an event;

a storage capable of storing a packet template;

a packet template generator to generate the packet template, wherein the packet template includes at least two protocol layers, one of which is an SNMP protocol layer, and each of the protocol layers include at least two static fields, and each of the at least two static fields have a preset value; and a packet generator to receive the indication of the event and to generate a packet for reporting the event independently of the computer and without execution of a software stack for each of the protocol layers, the generated packet being based on the packet template stored in said storage, said packet generator being configured to send the generated packet to said communication controller through the first interface for transmission over a shared medium.

41. The board of claim 40, wherein the at least two protocol layers of the packet template include a User Datagram Protocol (UDP) layer, an Internet Protocol (IP) layer, and a Simple Network Management Protocol (SNMP) layer.

42. The board of claim 41, wherein the at least two protocol layers of the packet template include a MAC layer.

* * * * *